UNITED STATES PATENT OFFICE.

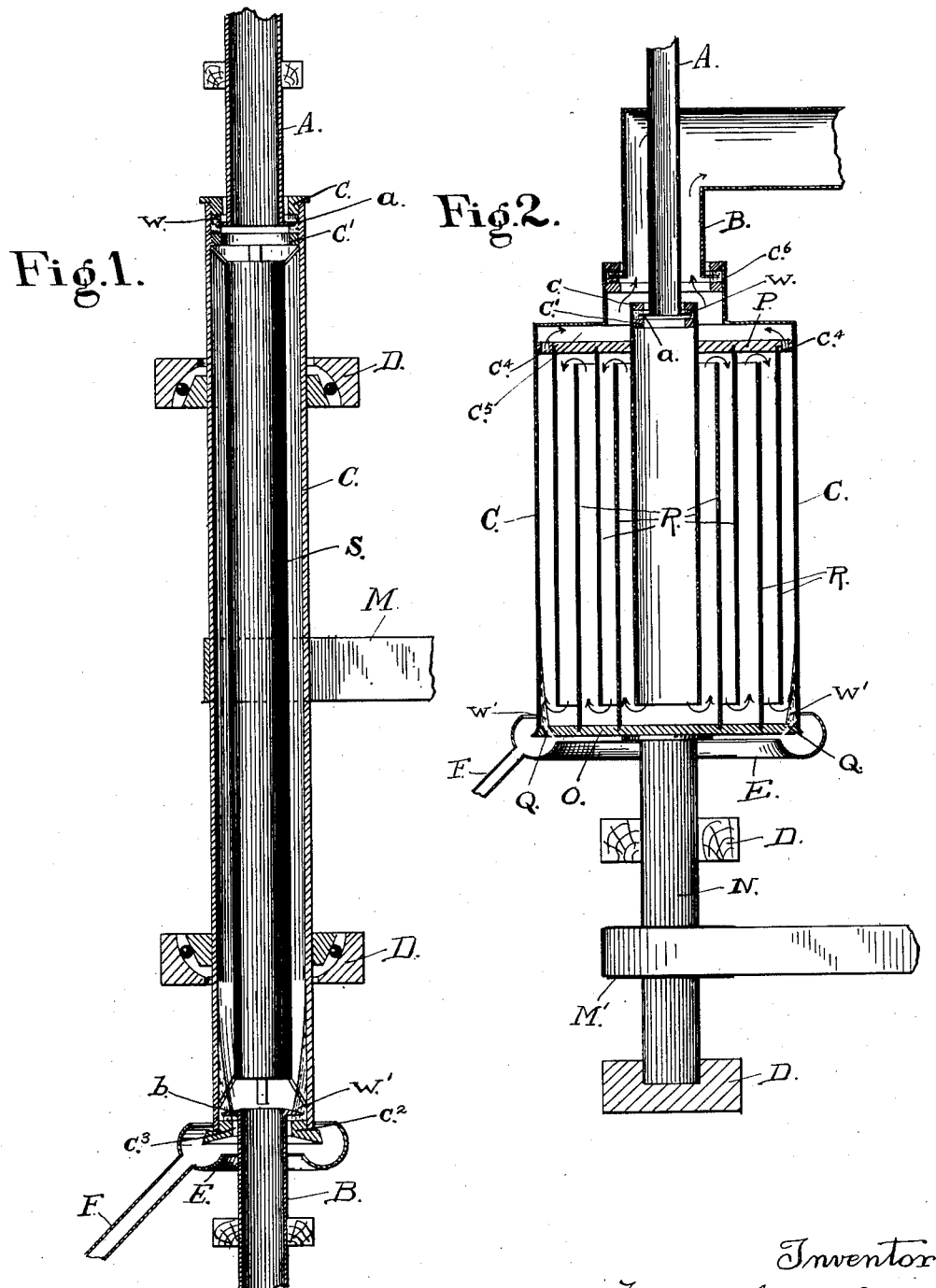

FREDERICK GARDNER COTTRELL, OF BERKELEY, CALIFORNIA, ASSIGNOR OF ONE-HALF TO HARRY EAST MILLER, OF OAKLAND, CALIFORNIA.

APPARATUS FOR SEPARATING SULFURIC ACID.

No. 866,844.      Specification of Letters Patent.      Patented Sept. 24, 1907.

Application filed January 4, 1906. Serial No. 294,524.

*To all whom it may concern:*

Be it known that I, FREDERICK GARDNER COTTRELL, a citizen of the United States, residing at Berkeley, county of Alameda, State of California, have invented certain new and useful Improvements in Apparatus for Separating Sulfuric Acid; and I hereby declare the following to be a full, correct, and exact description of the same.

My invention relates to apparatus used in the manufacture of sulfuric acid, and it consists in the novel centrifugally acting apparatus, which I shall hereinafter fully describe.

The apparatus is for use in connection with thae process of manufacturing sulfuric acid which forms tht subject matter of a contemporaneous application Serial No. 294,523, filed January 4, 1906, and which may be briefly and generally stated to consist in the separation and collection of the sulfuric acid previously disseminated in the form of fine liquid particles through indifferent gases. This mixture is formed by hydrating sulfur trioxid mixed with indifferent gases, whereby a fog or mist results, in which fine particles of sulfuric acid are held in suspension, which said particles under the influence of centrifugal action, are separated, collected and discharged.

In an apparatus for this purpose, it is essential to provide a suitable seal for the rotating shell which will prevent the escape of the gases, while still providing for the discharge of the collected sulfuric acid. Such a seal, together with the novel construction of the rotating shell, constitute my apparatus.

Referring to the accompanying drawings, Figure 1 is a vertical section illustrative of the liquid seals of the apparatus; Fig. 2 is a vertical section of the same.

Referring to Fig. 1, A is a pipe to deliver the gases with their suspended mist or fog to the shell C, which shell is mounted in suitable bearings D, here shown as in the nature of ball bearings. The shell has imparted to it a rotary motion about its axis, by the application of suitable power, indicated by the belt M. B is the escape pipe for the gases. The pipes A and B are non-rotating, being held stationary by any suitable means.

In order to provide a gas tight joint or connection between them and the rotating shell, there is a liquid seal, guarding the connection against the escape of the gases from the shell. This seal is best formed as follows. Upon the top of the shell C, on it inner ssurface is an annular flange $c$, below which, and separated therefrom is a second annular flange $c'$. The pipe A is provided with a foot flange $a$ which lies between and is separated from the flanges $c$ and $c'$. To form the seal a small quantity of liquid is poured into the top of the shell C around the pipe A, which, as shown, freely fits the shell, and said liquid, by the centrifugal action of the rotating shell, is maintained as an annular wall, represented by $w$, in the space between the two flanges $c$ and $c'$ and completely enveloping the foot flange $a$ of the pipe A, so that no gas can escape. Any surplus of the liquid will find its way down into the shell, and be discharged below. The seal at the bottom of the shell is formed by the collected sulfuric acid itself, as shown at $w'$ and is provided for by a bottom flange $c^2$ on the inner surface of the shell C, and a head flange $b$ on the top of the gas discharge pipe B, which said flange overlaps and is separated from the flange $c^2$ by a slight space, as shown. An annular opening $c^3$ is left between the flange $c^2$ and the pipe B for the discharge of the collected sulfuric acid, said discharge being delivered into the encircling trough E, and thence through a spout F to its destination.

In using this apparatus, the gaseous mixture with its fog or mist containing the fine particles of sulfuric acid in suspension, is fed down through the pipe A into the rotating shell C. In this shell the fine particles of liquid sulfuric acid are separated by centrifugal action from the gases and collect upon the walls of the shell and pass down to the bottom. In the bottom, assuming the parabolic form due to centrifugal action, the liquid sulfuric acid collected there forms the seal $w'$ against the escape of gases, around the pipe B.

The acid continuously discharges through the annular opening $c^3$ and is delivered into the trough E, and discharged from the spout F. The liquid seal $w$ maintained at the top by centrifugal action prevents the gas from escaping from the upper end of the apparatus.

In some cases, an inner concentric core, represented by S, may be used. This core is closed at both ends, and is supported firmly within the shell C, concentric with said shell, and rotating with it. The supports are arranged to hold the shell and core rigidly together, but they permit the free passage of the gases through the annular space between them, with which said space the pipes A and B communicate. The object of this arrangement is to maintain as much as possible of the gas and suspended mist inside the shell within a region where high centrifugal force is active, which is not the case near the axis of rotation. In Fig. 2, the complete apparatus is shown, similar letters being used where applicable. A represents the inlet pipe, which communicates through the liquid seal connection $w$ as before described, with the rotating separating shell. In this case, the shell is composed of an outer shell C, and a series of concentric, spaced, inner cylinders R, forming a series of annular functionally operative spaces for separation. These spaces may communicate in any suitable manner either above or below, or both above and below, or as here shown the cylinders may be alternately suspended from a top plate P, and a bottom plate O, their other ends terminating short of the opposite plates, whereby a continuous tortuous and extensive passage is provided, as is indicated by the arrows, for the flow of the gases from the central feed to the exterior shell. The outlet for the gases is, in this case, at the top, small openings $c^4$, being made in the upper plate P at the top of the outermost space of the shell, said openings communicating with a chamber $c^5$ above the plate. With a neck $c^6$ of this chamber the discharge pipe B communicates by means of a liquid seal connection similar to the seal $w$ at the entrance to said shell. The discharge of the collected sulfuric acid is obtained through obliquely directed ducts Q, in the bottom plate O, which opens into the surrounding trough E, the latter being provided with a spout F. In this instance the shell C is shown as mounted upon a shaft N supported in bearings D, and having power applied to it by means of a pulley M'. As the gases pass through, as indicated by the arrows, the liquid and any solid particles tend to be deposited, by the action of centrifugal force, on the inner surfaces of the cylinders R and the shell C, that which is deposited on the cylinders R eventually reaching the shell C.

Under steady running conditions, this liquid will assume the usual parabolic curve along the shell C, the layer being thickest at the bottom. When this layer attains a certain thickness, it will flow out at the bottom through the ducts Q, meanwhile forming a liquid seal $w'$ to prevent the escape of gases through this same route. When the machine is brought to rest, the remainder of the liquid flows out through the same channels.

It has long been recognized by sulfuric acid manufacturers that when gases containing "white fume" are passed through a centrifugal blower, a very considerable quantity of liquid is precipitated out in the casing of the same. This same principle has been applied to free gases of suspended particles, notably in the iron industry. In these cases, however, the outer containing shell on which the suspended matter is precipitated, remains stationary, and the gas is caused to rotate within it, by the rotation of separate moving parts within. In the present apparatus, on the other hand, the outer containing shell is itself a part of the rotating system. Where the outer shell is stationary, the speed of rotation of the gas must decrease as the surface of this outer shell is approached and the centrifugal force will thus fall off in this region; whereas in the above described apparatus, with rotating outer shell, the centrifugal force increases right up to the point where the suspended parts are deposited. Furthermore, this arrangement reduces the effect of eddy currents, which tend to sweep some of the particles which have been carried part way to the periphery by centrifugal force, back into the body of the gas once more, and thus greatly cut down the efficiency of the operation.

Having thus described the invention, what I claim as new and desire to secure by Letters Patent is—

In a centrifugal apparatus for the separation of non-gaseous particles from a gaseous body in which they are held in suspension, a rotating shell having within it a plurality of concentric spaced cylinders forming a series of functionally operative annular channels for separation, a non-rotating pipe leading into said shell, and a non-rotating pipe issuing therefrom, both pipes communicating with said channels, a liquid seal guarding the fitting of each pipe against the escape of gas from the shell, and means for discharging the separated non-gaseous particles from said channels.

In witness whereof I have hereunto set my hand.

FREDERICK GARDNER COTTRELL.

Witnesses:
J. COMPTON,
D. B. RICHARDS.